(12) United States Patent
Schaevitz et al.

(10) Patent No.: US 12,216,313 B2
(45) Date of Patent: Feb. 4, 2025

(54) SILICON PHOTONIC EDGE COUPLED CONNECTOR VIA COLLIMATION

(71) Applicant: Broadcom International Pte. Ltd., Singapore (SG)

(72) Inventors: Rebecca Schaevitz, Sunnyvale, CA (US); Near Margalit, Westlake Village, CA (US); Vivek Raghunathan, Mountain View, CA (US); Dicky Lee, San Jose, CA (US); Hari Potluri, Milpitas, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 30 days.

(21) Appl. No.: 17/732,002

(22) Filed: Apr. 28, 2022

(65) Prior Publication Data

US 2023/0251428 A1    Aug. 10, 2023

Related U.S. Application Data

(60) Provisional application No. 63/306,808, filed on Feb. 4, 2022, provisional application No. 63/306,870, filed on Feb. 4, 2022.

(51) Int. Cl.
*G02B 6/42* (2006.01)
*G02B 6/32* (2006.01)

(52) U.S. Cl.
CPC .......... *G02B 6/4204* (2013.01); *G02B 6/322* (2013.01); *G02B 6/423* (2013.01); *G02B 6/4249* (2013.01)

(58) Field of Classification Search
CPC ...... G02B 6/322; G02B 6/4204; G02B 6/423; G02B 6/4249
See application file for complete search history.

(56) References Cited

U.S. PATENT DOCUMENTS

| | | | |
|---|---|---|---|
| 6,491,447 B2* | 12/2002 | Aihara | G02B 6/4224 385/92 |
| 6,768,844 B2* | 7/2004 | Murphy | G02B 6/262 385/52 |
| 7,108,432 B2* | 9/2006 | Nagasaka | G02B 6/4292 385/94 |
| 8,876,415 B2 | 11/2014 | Yonezawa et al. | |
| 9,568,679 B2 | 2/2017 | Doany et al. | |
| 9,726,826 B2 | 8/2017 | Ooi et al. | |
| 10,146,009 B2 | 12/2018 | Badihi et al. | |

(Continued)

FOREIGN PATENT DOCUMENTS

JP    2008-089879    4/2017
WO   WO-2013/158990 A1    10/2013

OTHER PUBLICATIONS

Extended European Search Report dated May 17, 2023, EP23155062.5-1020, 10 pages.

*Primary Examiner* — Daniel Petkovsek
(74) *Attorney, Agent, or Firm* — Quarles & Brady LLP (57) ABSTRACT

A coupled optic system configured for collimation of light. The coupled optic system includes an optic system. The optic system includes a shelf. The shelf includes one or more optic alignment surfaces. The optic system includes one or more interface lenses coupled to the shelf. The coupled optic system includes an optical connector. The optical connector includes one or more connector lenses. The optical connector includes one or more connector alignment surfaces.

8 Claims, 9 Drawing Sheets

(56) References Cited

U.S. PATENT DOCUMENTS

| | | | |
|---|---|---|---|
| 10,386,588 B1* | 8/2019 | Cai | G02B 6/4249 |
| 10,551,569 B2* | 2/2020 | Gui | G02B 6/29365 |
| 10,725,254 B2 | 7/2020 | Shastri et al. | |
| 11,067,763 B2 | 7/2021 | Wang et al. | |
| 2014/0185988 A1 | 7/2014 | Qu et al. | |
| 2014/0199034 A1* | 7/2014 | Kuo | G02B 6/3897 |
| | | | 385/93 |
| 2015/0063755 A1 | 3/2015 | Doany et al. | |
| 2015/0139590 A1* | 5/2015 | Oniki | G02B 6/3853 |
| | | | 385/79 |
| 2015/0277066 A1 | 10/2015 | Nakagawa et al. | |
| 2019/0086618 A1 | 3/2019 | Shastri et al. | |
| 2021/0149128 A1 | 5/2021 | Schaevitz et al. | |

\* cited by examiner

SILICON PHOTONIC EDGE COUPLED CONNECTOR VIA COLLIMATION

CROSS REFERENCE TO RELATED APPLICATIONS

The present disclosure claims the benefit under 35 U.S.C. § 119(e) of U.S. Provisional Patent Application Ser. No. 63/306,870, filed Feb. 4, 2022, entitled SILICON PHOTONIC EDGE COUPLED CONNECTOR VIA COLLIMATION, naming Rebecca Schaevitz, Near Margalit, Vivek Raghunathan, Dicky Lee, and Hari Potluri as inventors, which is incorporated herein by reference in the entirety.

The present disclosure claims the benefit under 35 U.S.C. § 119(e) of U.S. Provisional Patent Application Ser. No. 63/306,808, filed Feb. 4, 2022, entitled VERTICAL PLACEMENT SILICON PHOTONICS OPTICAL CONNECTOR HOLDER & MOUNT, naming David John Kenneth Meadowcroft as inventor, which is incorporated herein by reference in the entirety.

BACKGROUND

Co-Packaged Optics (CPO) is an advanced heterogeneous integration of optics and electronics in a single package aimed at addressing next generation bandwidth and power challenges.

As data rates increase there is a strong trend to move high-speed signals of a transceiver closer to the switch silicon. This is giving rise to co-packaged optics (e.g., the mounting of transceiver optics proximate to switch silicon).

Generally, Photonic Integrated Circuits (PICs) have a light input and a light output. Typically, the input on the transmitter side of the PIC is continuous wave (CW) light which is modulated and sent into the output. The input on the receiver side of the PIC is modulated light which is then converted into electrical signals.

The typical solution for inputting and outputting light from photonics integrated circuits (PICs) is to actively align a block of optical fibers (e.g., fiber block) and glue (e.g., epoxy) the optical fibers in place. This is known as pigtailing.

Pigtailed fiber optic cables may become unwieldy and hard to manage. Further, if one of the pigtailed fiber optic cables is damaged the whole structure may become useless and may need to be scrapped. This can be costly. In addition, CPO switch integrated circuits (ICs) may need to be Ball Grid Array (BGA) attached to another printed circuit board (PCB) or substrate. Such a configuration requires the structure to undergo solder reflow at high temperatures which may be damaging to the fiber optic cable coatings.

The following disclosure addresses at least some of the drawbacks of previous techniques.

SUMMARY

In one aspect, embodiments of the inventive concepts disclosed herein are directed to optic systems and optical connectors with collimation.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Moreover, while various components may be described or depicted as being "coupled" or "connected", any two components capable of being so associated can also be viewed as being "couplable," to each other to achieve the desired functionality. Specific examples of couplable include but are not limited to physically mateable, physically fixed relative to another component, and/or physically interacting components. Other examples include being optically coupled, such as being optically aligned and configured to direct an optical signal being two components. Also, while various components may be depicted as being connected or coupled directly, direct connection or direct coupling is not a requirement. For example, components may be indirectly coupled (e.g., couplable) through some interface, device, or intermediate component whether physically (e.g., physically mated), optically, mechanically (e.g., via dynamically movable and physically interactable components), electrically, or otherwise. For example, components may be in data communication (e.g., optical signal communication) with intervening components that are not illustrated or described. It may be appreciated that "data communication" refers to both direct and indirect data communication (e.g., there may be intervening components). In one example, being coupled is permanent (e.g., two components epoxied, fused, and/or the like). In another example, being coupled is reversible (e.g., being "removably" coupled/couplable). For example, "removably" coupled/couplable may mean being capable of being coupled and uncoupled repeatedly and/or non-destructively (e.g., such as by being coupled by being temporarily held, clamped, pinned, latched, positioned, and/or the like in place). For example, an optical connector of the present disclosure, in at least some embodiments, may be removably coupled (e.g., couplable) to the optic system.

In addition, "edge" coupled, "edge" couplable, and the like may mean being in (and/or configured to be in) an edge coupling to an edge (e.g., such as an edge of a chip and/or PIC). Generally, there are mainly two types of optical fiber-to-chip optical couplings used: off-plane (vertical, out of plane, and the like) coupling and in-plane (butt) coupling. The former typically uses grating couplings and edge couplings are used with the latter. For example, grating couplings provide for off-plane coupling of light onto PICs utilizing an optical fiber positioned above a substrate/wafer surface (e.g., a portion of a length of the optical fiber being above and parallel to the substrate surface). On the other hand, for example, the substrate may utilize narrow etched areas around the edge of a die to facilitate access to edge couplers.

Further, "alignment" may mean any alignment, such as structural and/or optical alignment. For example, components may be optically aligned such that an optical axis of a first component is orientated relative to an optical axis of a second component (e.g., to within a given tolerance such that efficiency losses of an optical signal between the optical axes of the two components are minimized). In another example, structural alignment may mean that one component is orientated (e.g., and/or configured to be orientated) relative to another component (e.g., via one or more degrees of freedom and/or to within one or more alignment tolerances of such degrees of freedom). For instance, one component may be aligned to another component to within a tolerance in regards to six degrees of freedom, such as to within a quantity of a unit of translation (e.g., 1 micron) in an X, Y, and Z direction and a quantity of a unit of rotation about the X, Y, and Z direction.

In at least some embodiments, an alignment is provided for by one or more alignment surfaces. For example, an alignment surface may be a physically mateable and/or guidable surface that is configured to mate with and/or guide a different alignment surface of a different component, thereby providing for the alignment of the different component via such mateable (and/or guiding) alignment surfaces. For instance, such an alignment surface (e.g., comprising multiple alignment surfaces in different orientations) may be configured to constrain one or more degrees of freedom of the different component (e.g., due to the shape and orientation of such alignment surfaces).

Generally, active alignment is alignment performed in a well-controlled environment compared to passive alignment. Active alignment processes are typically much more costly and more time consuming to perform than passive alignment processes and are less practical to perform in the field.

For example, "active" alignment, being "actively" aligned, and the like may mean that active alignment techniques are required and/or conducive for such an alignment, and/or that a system is configured for being made/coupled using active alignment techniques (e.g., actively placed to within specific alignment tolerances). For example, active alignment techniques may be viewed as an alignment (e.g., permanent alignment) provided for using well-controlled alignment processes and/or precision tools. Precision tools may mean tools that are not necessarily available when an aligned component is in the field (e.g., away from its location of manufacture, in a practical and/or natural use case). In one example, an active alignment means using an imaging measurement system to align optical fibers with respective light sources and test equipment to test the optical signal launched into the optical fiber by the light source as the optical signal passes out of the opposite end of the fiber. By using these active alignment processes and active alignment equipment, a determination can be made as to whether the light source and the optical fiber are in precise alignment with one another. For instance, mechanical robotic grippers with precisely controllable degrees of freedom may grip one or more optical fibers until a desired alignment tolerance is met and hold the optical fibers while they are then permanently fixed in place (e.g., epoxied).

On the other hand, passive alignment, being passively aligned, and the like may mean that passive alignment techniques are required and/or conducive for such an alignment, and/or that a system is configured for being made/coupled using passive alignment techniques (e.g., to within specific alignment tolerances). For example, passive alignment may mean placing an optical connector by hand or with minimal tools (e.g., hand-operated tool such as tweezers). Such passive alignment may further mean utilizing the aide of passive guidance of one or more alignment surfaces (e.g., vertical pins, horizontal grooves). Passive guidance may mean guidance using little to no external tools (e.g., using just a user's hand and the alignment surfaces of the system itself). For example, one or more initial alignment surfaces (e.g., vertical pins) may initially keep a component constrained (passively) to a relatively rough tolerance, while one or more second alignment surfaces (e.g., as mateable surfaces, v-grooves) may provide for the ultimate (passive) alignment to a more precise tolerance. Such an example is for illustrative purposes and any combination and configuration of passive alignment surfaces and passive alignment processes may be used.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, some embodiments of the inventive concepts disclosed herein are directed to coupled optic systems configured for collimation of light. In some embodiments, this disclosure relates to, but is not necessarily limited to, passively aligning and securing an optical connector to the inputs and outputs of a silicon Photonic Integrated Circuit (PIC) utilizing collimated light. For example, this disclosure includes at least one embodiment directed to co-packaged optics (CPO) next to a switch ASIC with an edge coupled optical connector utilizing collimated light.

One of the challenges in silicon photonics is getting the light on and off the silicon in a low cost, high volume manufacturable way. In co-packaged optics (CPO), silicon photonics are located on the same package as other silicon integrated circuits (IC), such as a switch application specific integrated circuit (ASIC).

One approach to coupling optical fibers to CPO relies on butting up (pigtailing) optical fibers to silicon photonics, and permanently fixing the optical fibers in place. For example, in an overlapping configuration where the fiber block overlaps the silicon photonics block and the optical fibers are aligned utilizing grooves (as shown in FIG. 1B). Further, the optical fibers may be aligned (actively) and fixed in place by an adhesive (e.g., epoxy). In this regard, an end of the optical fibers may, in a sense, be permanently attached to the silicon photonics and the other end may use standard optical connectors (e.g., multi-fiber push-on (MPO) or LC connectors). It is contemplated herein that such a configuration may work reasonably well in transceiver-based technologies, where the solution is typically fully packaged and the alignment of the entire assembly well controlled, but may present challenges in CPO applications.

A challenge of such a configuration is that the fiber block (e.g., fiber array unit (FAU)) may typically be small, translucent, delicate, and hard to handle and locate. Further challenges include requiring optical fiber alignment tolerances as low as sub-micron precision for typical solutions.

Some embodiments of the present disclosure address at least some of these challenges. For example, at least one embodiment of the present disclosure allows for a system where an array of optical fibers is much easier to locate/align (e.g., optically align) and is not permanently attached (e.g., rather, may be removably coupled).

Figure 1A:
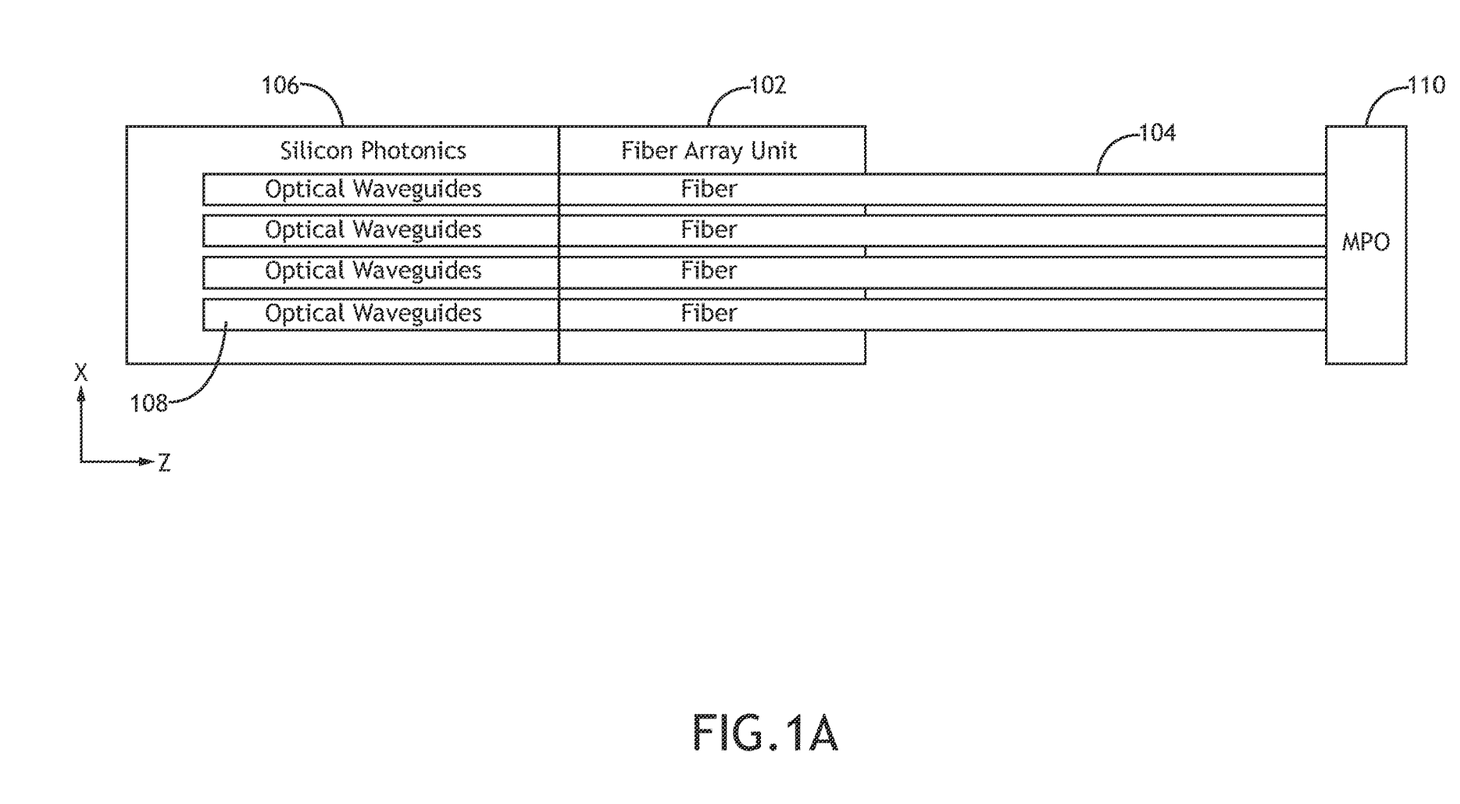
FIG. 1A shows a top view of a schematic representation of a fiber coupling according to an exemplary embodiment.
Figure 1B:
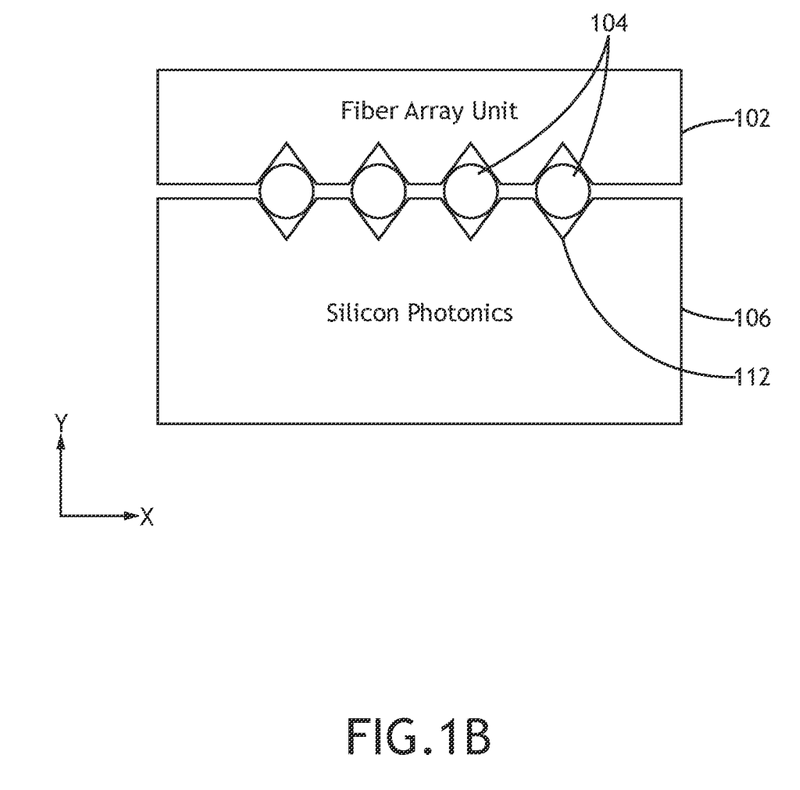
FIG. 1B shows a cross sectional side view of a schematic representation of a fiber coupling according to an exemplary embodiment.

Referring to FIGS. 1A and 1B, views of a schematic representation of a fiber coupling are shown. While FIGS. 1A and 1B may illustrate an example pigtail coupling, at least some of the elements shown and related descriptions may apply to (and/or be included in) one or more embodiments of the present disclosure.

In at least some embodiments, a coupled optic system 212 includes silicon photonics 106 (e.g., a silicon photonics block 106 as shown).

In at least some embodiments, the coupled optic system 212 includes optical fibers 104. However, it should be noted that at least in some embodiments, the optical fibers of coupled optic system 212 are not permanently pigtailed relative to the silicon photonics 106.

In at least some embodiments, the coupled optic system 212 includes a fiber block 102.

In at least some embodiments, the coupled optic system 212 includes one or more optical waveguides 108 or is couplable to one or more optical waveguides 108.

In at least some embodiments, the coupled optic system 212 includes grooves 112. For example, an optical connector of the coupled optic system 212 may include grooves 112.

In at least some embodiments, the coupled optic system 212 (e.g., an optical connector of the coupled optic system 212) includes connectors on an end of the optical fibers 104 (e.g., multi-fiber push-on (MPO) or LC connectors).

In at least one embodiment the coupled optic system 212 does not include a socket (not shown) for coupling the optic system 216 (e.g., PIC) to a CPO system (e.g., CPO system 400 of FIG. 4), package (e.g., package 402), substrate, and/or the like. For example, in at least one embodiment, the optic system is configured to be soldered to at least one of a CPO system or a package.

Removing sockets (not shown) that are typically used to attach the silicon photonics 106 to the same package (e.g., package 402) as a silicon integrated circuit (IC) (not shown) may present other challenges. Sockets may be able to withstand solder reflow conditions but may induce electrical loss and occupy a large area, thus exacerbating some of the challenges that silicon photonics in general are attempting to relieve. It is contemplated that if, instead of using sockets, the silicon photonics 106 are soldered onto and/or configured to be soldered onto the same package as the silicon IC (e.g., helping to reduce occupied area and improve speed and bandwidth performance), then the optical fibers 104 that are attached to the silicon photonics 106 may be subjected to harsh solder reflow conditions (e.g., high heat). Therein lies some of the challenges of using typical pigtailed optical fibers 104 in such a configuration without sockets. At least some of the embodiments of the present disclosure do not use pigtailed optical fibers 104 and may instead, for example, use a passive, removably couplable optical connector 210.

Figure 2A:
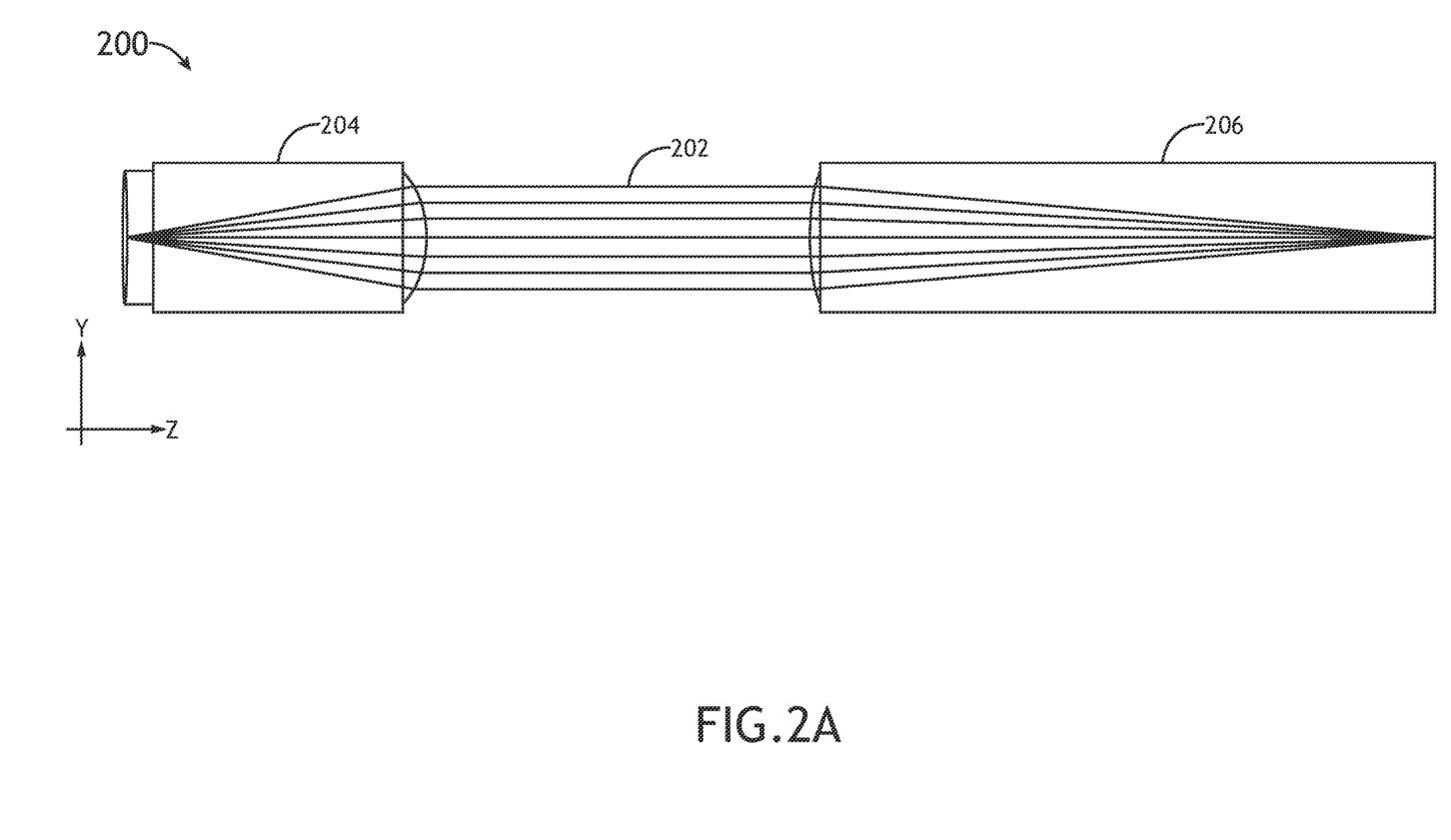
FIG. 2A shows a block diagram of a fiber coupling with collimated light according to an exemplary embodiment.
Figure 3A:
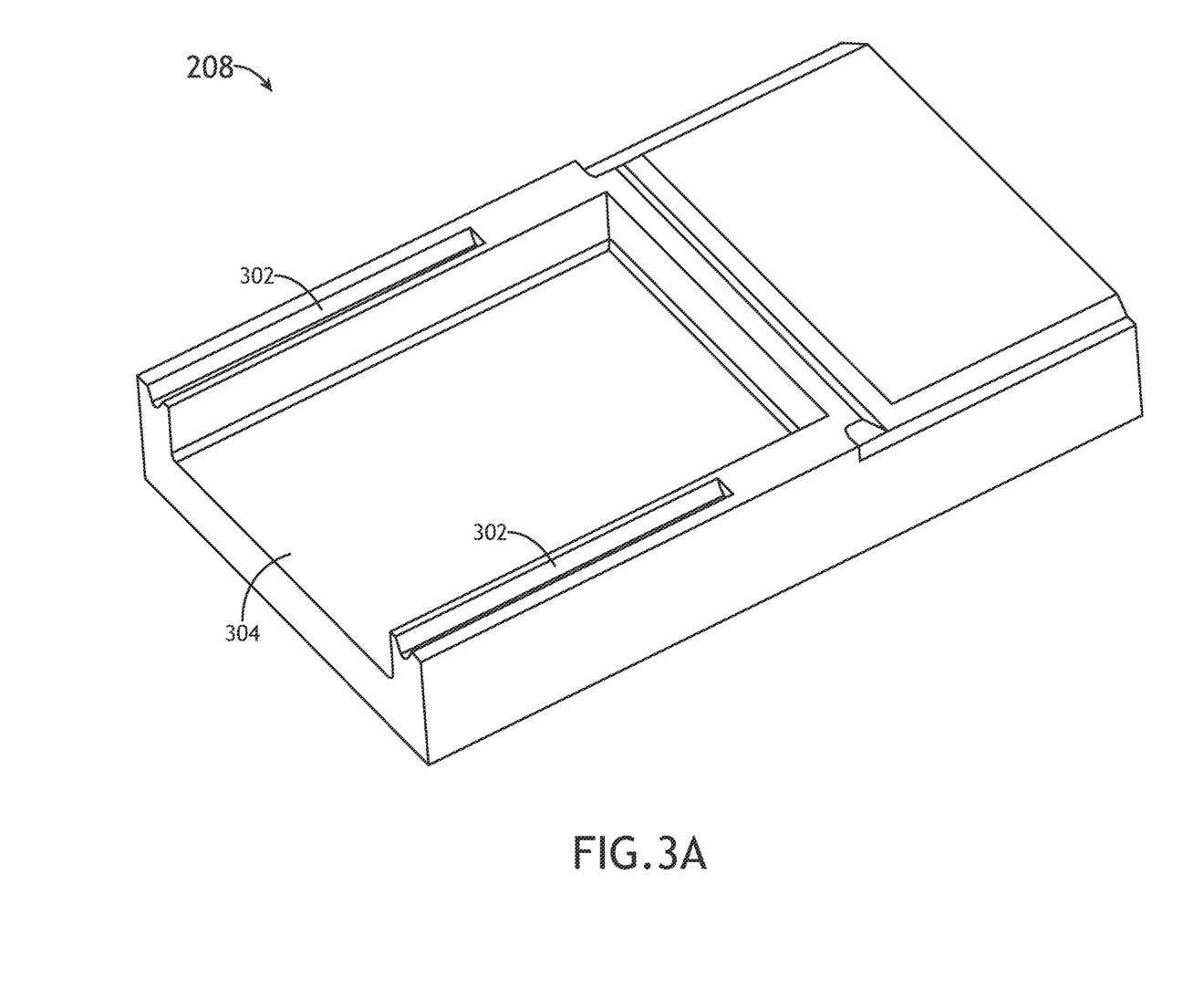
FIG. 3A shows a shelf according to an exemplary embodiment.
Figure 3B:
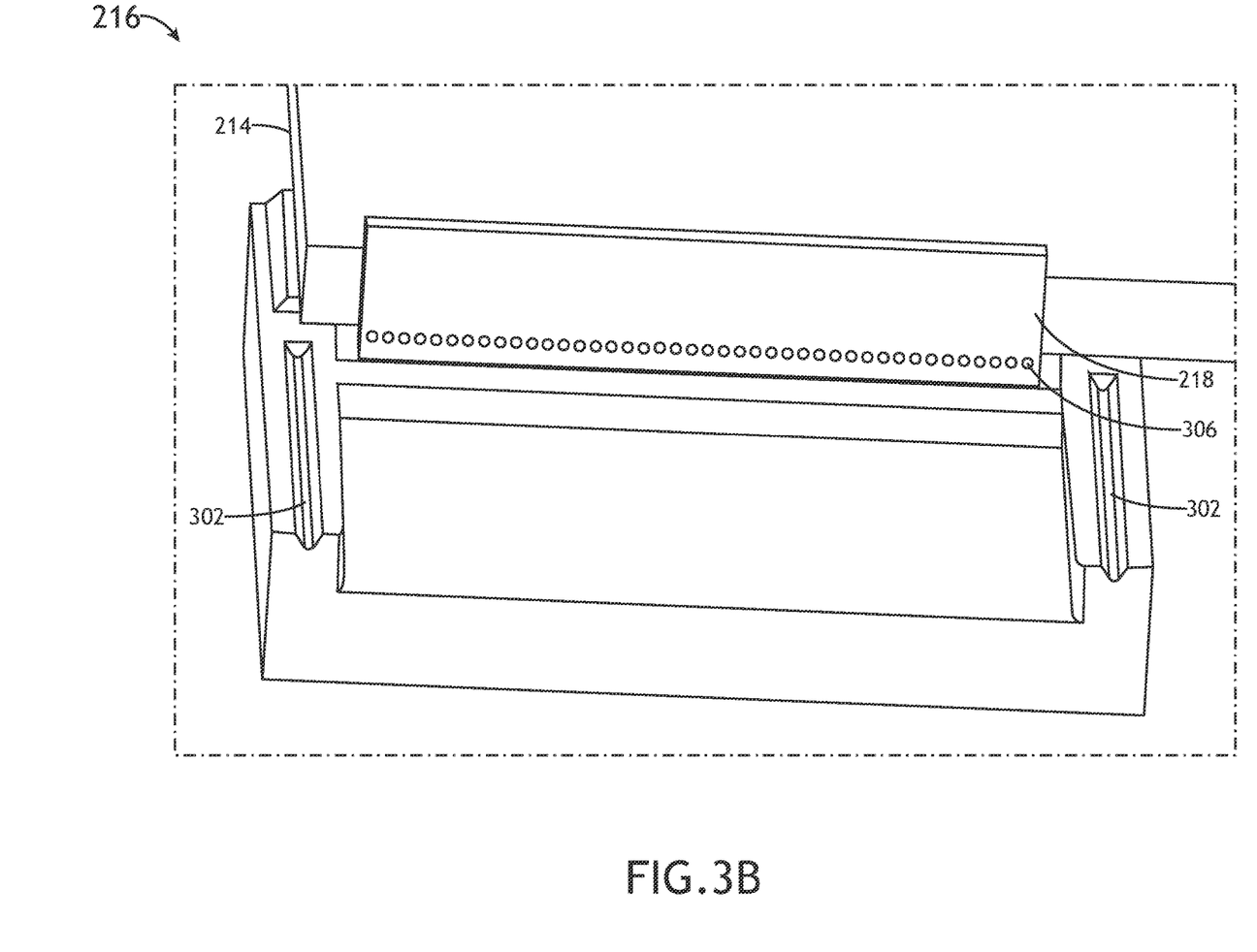
FIG. 3B shows an optical connector system according to an exemplary embodiment.

For purposes of the present disclosure, in at least some embodiments, it is noted that a Z-direction may be parallel with an optical axis as shown in FIG. 2A, a Y-direction may be normal to a plane containing interface lens surfaces 306 shown in FIG. 3B (e.g., vertical), and an X-direction orthogonal thereto (e.g., within the plane containing the interface lens surfaces 306).

Referring to FIG. 2A, a block diagram 200 of a fiber coupling with collimated light 202, (e.g., collimated light coupling), aligned in a Z-direction is shown, in accordance with one or more embodiments of the present disclosure. In at least one embodiment, a first lens 204 may be aligned with a second lens 206 and may be configured such that the light 202 directed between the lenses is collimated. For example, the first lens 204 may be a lens coupled to (e.g., connected to, associated with, and/or fixed relative to) a shelf (e.g., shelf 208 of FIG. 2B) and the second lens 206 may be a lens coupled to a connector (e.g., connector 210 of FIG. 2B).

In at least one embodiment, such a collimated light coupling may be used to alleviate (relax) typical alignment tolerances. In a non-limiting example, as noted, a typical (non-collimated) fiber coupling may require sub-micron alignment tolerances (e.g., in at least some single modal systems). In at least one embodiment of the present disclosure, using a collimated light coupling may allow for larger alignment tolerances of at least 5, 10, 15 or up to 20 microns in the X and/or Y direction, and/or at least 25, 50, or up to 100 microns in the Z-direction. Further, a third part (e.g., shelf 208) having alignment surfaces (e.g., optic alignment surfaces 302 of FIG. 3A) may be utilized to act as a guide to align the optic system 216 to the optical connector 210.

Figure 2B:
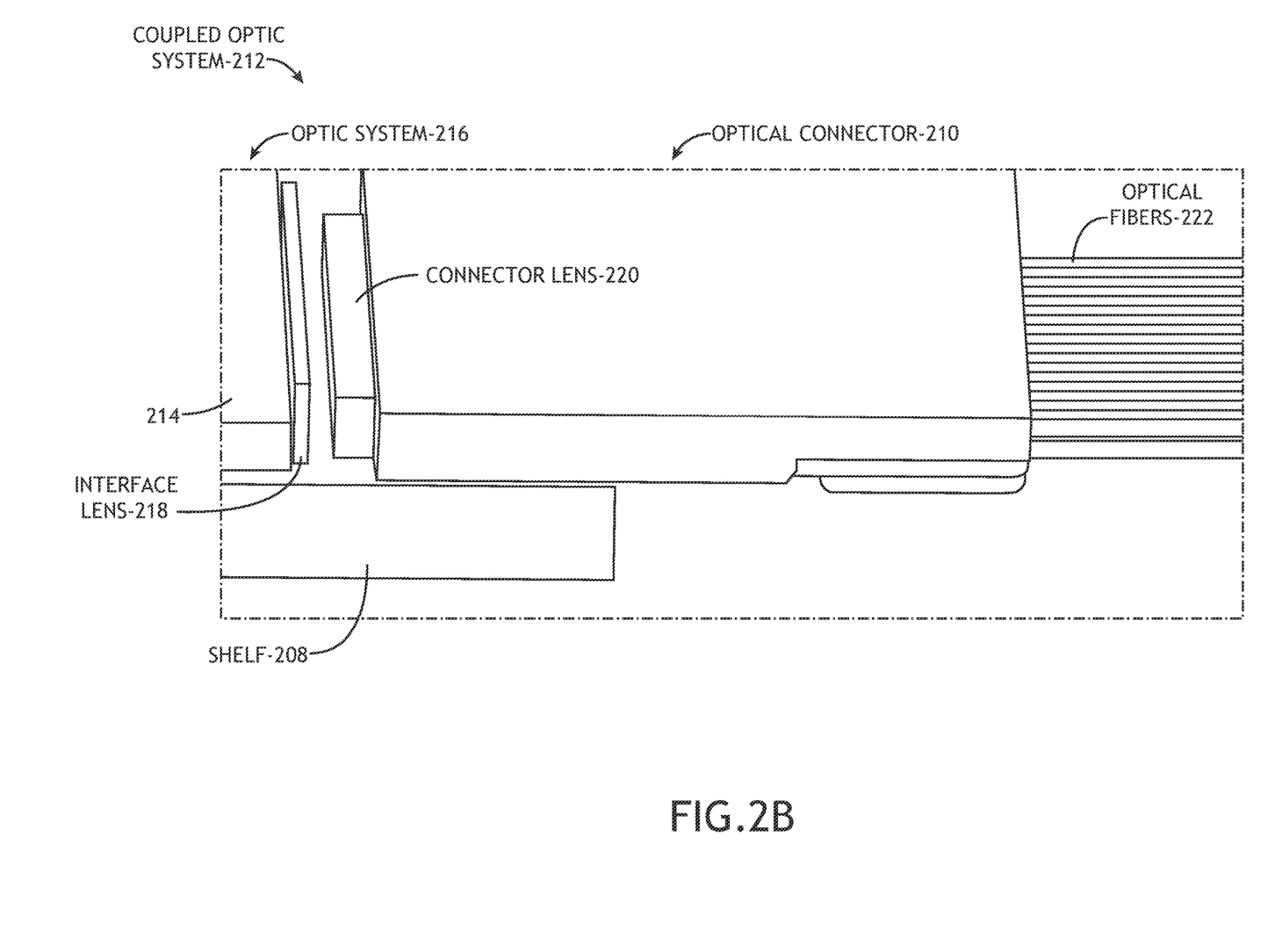
FIG. 2B shows an optical connector system according to an exemplary embodiment.

Referring to FIG. 2B, a coupled optic system 212 is shown, in accordance with one or more embodiments of the present disclosure. The coupled optic system 212 may include an optic system 216 and an optical connector 210. In at least one embodiment, as shown, the optic system 212 may be configured to be passively aligned/coupled (e.g., optically and/or physically) with the optical connector 210 (e.g., via a pin-in-groove design).

In at least one embodiment, the optic system 216 includes a shelf 208 (described in more detail below) and one or more interface lenses 218. The shelf may be coupled (e.g., attached) to the one or more interface lenses 218 (i.e., one or more PIC lenses, and the like). In at least one example, the shelf 208 is attached to a structure 214 (e.g., photonic integrated circuit (PIC), structure of a package, and the like).

In at least one embodiment, the optical connector 210 includes one or more connector lenses 220 corresponding to the one or more interface lenses 218. In a non-limiting example, the optical connector may be an array unit (e.g., Fiber Array Unit (FAU)) and/or include one or more optical fibers 222. In at least one embodiment, the coupled optic system 212 includes optical fibers 222 at a 127 um pitch (e.g., spacing). In at least one embodiment, the coupled optic system 212 includes up to 40 optical fibers 222 per optical connector 210. It should be noted, however, that any number of optical fibers 222 may be included (e.g., hundreds).

Referring to FIG. 3A, a shelf 208 is shown, in accordance with one or more embodiments of the present disclosure. In at least one embodiment, the shelf 208 is configured to accept a coupling of an optical connector 210, the optical connector 210 configured to be removably couplable with the optic system 216. In at least one embodiment, the shelf 208 is configured to accept a passive optical coupling and structural alignment of an optical connector 210. In at least one embodiment, the shelf 208 is configured to be edge-coupled (e.g., to a PIC).

While the shelf 208 is shown as a single body with one optic alignment surface 302 on each side of a middle portion 304 (e.g., recess), the shelf 208 is not limited to such an embodiment and the shelf 208 may, for example, include a variety of numbers, locations, shapes, and/or the like of optic alignment surfaces 304, middle portions 304, and any other element/limitation depicted or described. For example, the shelf 208 may have optic alignment surfaces 302 of various sizes (e.g., relatively larger sizes for a rough initial alignment in one direction and smaller sizes for a final precise alignment in a different direction), of a variety of shapes (grooves such as a V-shaped groove, trenches, rectangular notches, U-shaped grooves, pyramid-shaped surfaces, cone-shaped surfaces, vertical pins, and/or any other shape conducive to alignment), and/or in a variety of locations of the shelf 208 (e.g., on a surface of the middle portion 304, on a top surface (as shown), on a bottom surface, on one or more outside side surfaces, on a front surface, on a back surface, and/or the like). Similarly, any of the surfaces/elements/limitations of the optical connector 210 (e.g., the connector alignment surfaces 504) that are described and depicted in the present disclosure are not limited to what is described and depicted and may likewise vary in number, size, location, and/or the like.

In at least one embodiment, the shelf 208 includes one or more optic alignment surfaces 302. For example, the one or more optic alignment surfaces 302 may be two or more optic alignment surfaces 302. For example, in at least one embodiment, the optic alignment surfaces 302 may be groove surfaces (e.g., v-shaped notches, and the like).

For example, the shelf 208 may utilize groove depth (e.g., of optic alignment surfaces 302 shown in FIG. 3A) and/or epoxy thickness to the structure 214 (e.g., PIC) to ensure good dimensional tolerance in the optical Y-direction for optical fiber-to-PIC waveguide alignment within collimated beam alignment requirements. In at least one example, optic alignment surfaces 302 may also control (e.g., constrain within a set tolerance) the optical X-direction alignment via the angle of a groove (e.g., V-shaped groove) of the optic alignment surfaces 302 being well controlled/designed/manufactured. Moreover, alignment tolerances in the Z-direction (e.g., along optical axis) may be larger than the X-direction and Y-direction alignment requirements. For example, embodiments of the present disclosure allow for 50-100 um tolerances in the Z-direction (e.g., which external mechanical piece parts may be utilized to hold such tolerances), wherein the Z-direction is parallel to an optical axis of the one or more interface lenses 218. For example, optic alignment surfaces 302 may be configured to allow for alignment within 20 microns relative to an X-direction and/or a Y-direction. Such larger tolerances may be a result of the collimation of lightbeam(s).

In at least one embodiment, at least one of: the shelf 208 is configured to be actively aligned with the one or more interface lenses 218; or the shelf 208 is actively aligned with the one or more interface lenses 218. In some embodiments, at least one of: the shelf 208 being configured to be fixed in place relative to the one or more interface lenses 218; or the shelf 208 being fixed in place relative to the one or more interface lenses 218.

For example, the shelf 208 may be fixed (e.g., epoxied) in place relative to the one or more interface lenses 218 (and, e.g., one or more optical waveguides or other components of silicon photonics) (e.g., in a controlled assembly procedure). In this regard, the shelf 208 may be actively aligned relative to the one or more interface lenses 218 such that an element passively aligned (or removably couplable) to the shelf may be passively aligned (or removably couplable) to the one or more interface lenses 218 (and, e.g., optical waveguides).

In at least one embodiment, the shelf 208 includes a middle portion 304 (e.g., recess, void, and/or the like) with at least one optic alignment surface 302 on opposite sides of the middle portion 304 and the middle portion 304 configured to accept (receive) an optical connector 210.

In at least one embodiment, a material of the shelf 208 includes at least one of glass, silicon, or metal. For example, the shelf 208 may be a glass. In another example, the shelf 208 is silicon. In at least some examples, the shelf 208 is relatively delicate and thin.

Referring to FIG. 3B, an optic system 216 including one or more interface lenses 218 is shown, in accordance with one or more embodiments of the present disclosure. In at least one embodiment, the one or more interface lenses 218 include one or more interface lens surfaces 306, as shown, wherein each lens surface 306 corresponds to a different optical axis. For example, each optical axis may be configured to be aligned with a corresponding optical axis of a connector lens surface of a connector lens 220 of an optical connector 210. For example, the one or more interface lenses 218 may be configured to at least one of, receive and/or transmit a collimated lightbeam, or at least partially collimate a lightbeam.

Generally, a lens (e.g., interface lens 218, connector lens 220, lens surface 306, and the like) is a component/element comprising at least partially transparent material configured to (e.g., shaped to) direct an electromagnetic beam. For example, a lens may be configured to collimate, disperse, and/or concentrate one or more portions of a beam (or multiple beams). For example, a lens may mean a single structure used to direct multiple beams (e.g., corresponding to multiple optical fibers 222).

The one or more interface lens surfaces 306 may be part of one interface lens structure 218 as shown or may be separate lens structures. In one nonlimiting example, as shown, the one or more interface lens surfaces 306 may be aligned in a row. It is noted that the example and descriptions above are merely illustrative and any number of interface lenses 218 with any number of interface lens surfaces 306 and optical axes may be used in any configuration with any number of rows or patterns (e.g., likewise for corresponding connector lenses 220).

Figure 4:
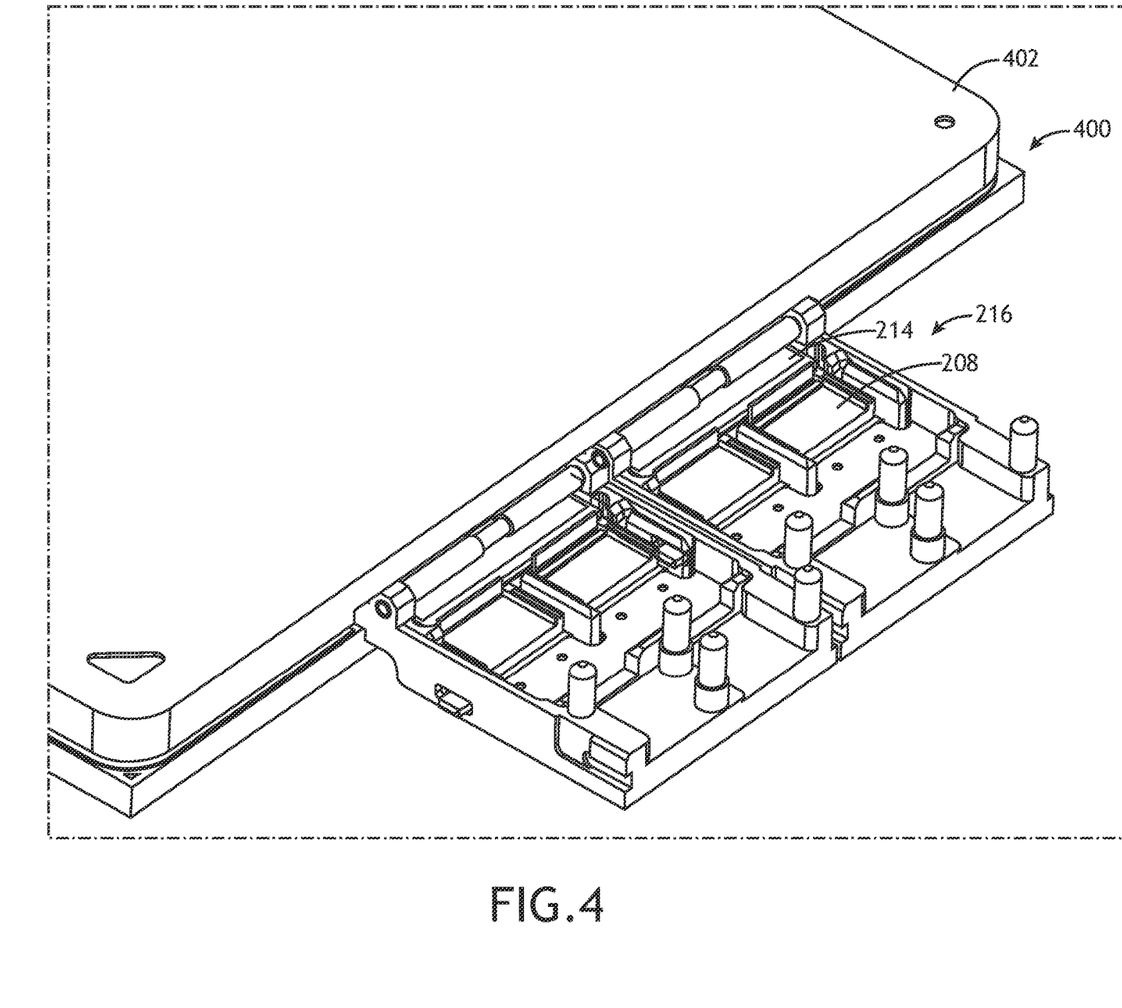
FIG. 4 shows an optic system according to an exemplary embodiment.

Referring to FIG. 4, a nonlimiting example of an optic system 216 is shown, in accordance with one or more embodiments of the present disclosure. In at least one embodiment, the optic system 216 may include multiple shelves 208 (e.g., four) on at least one side of a co-packaged optics (CPO) system 400 including a package 402.

In at least one embodiment, the coupled optic system 212 includes one or more elements from U.S. Provisional Patent Application Ser. No. 63/306,808, filed Feb. 4, 2022, which is hereby incorporated by reference in its entirety.

Figure 5A:
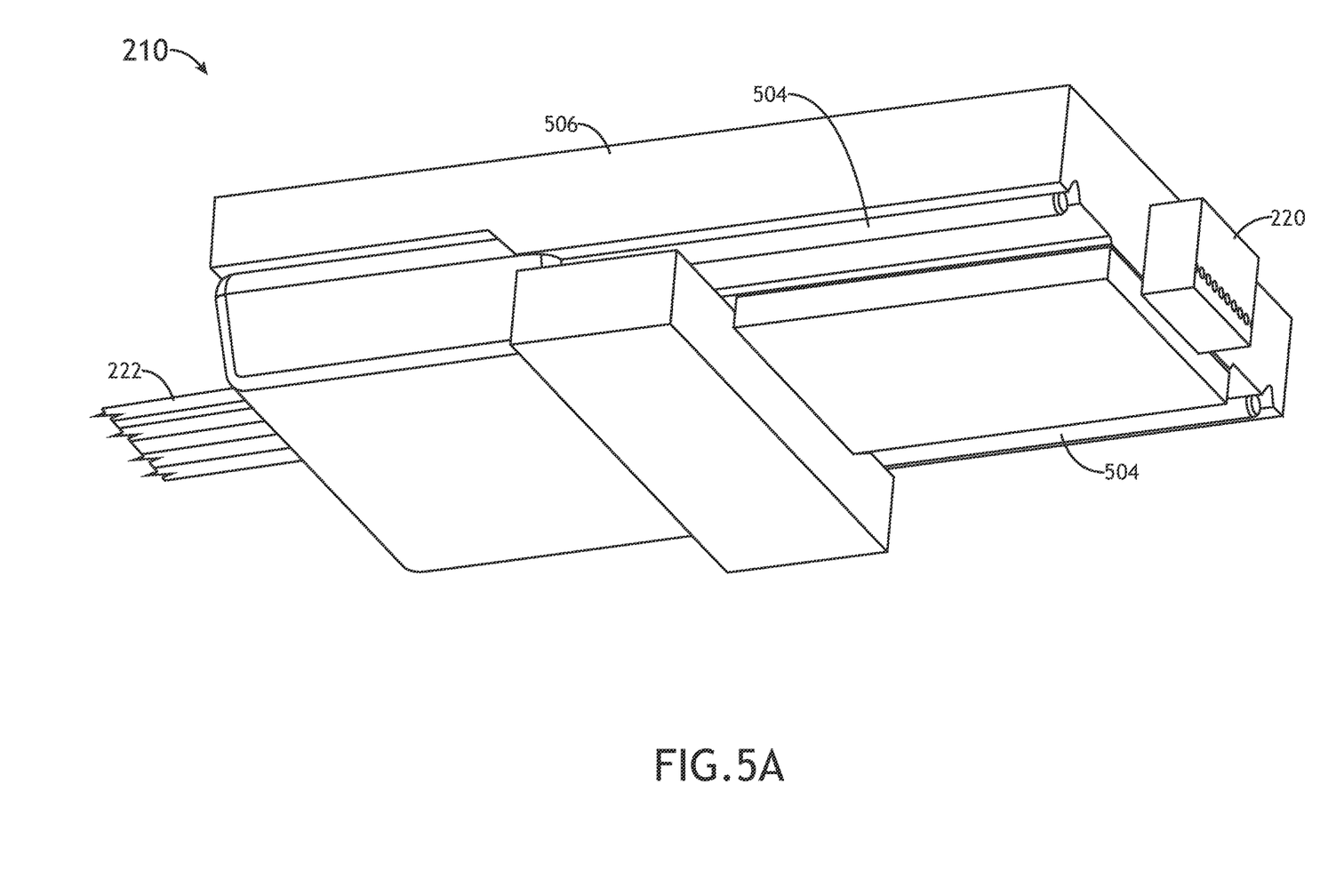
FIG. 5A shows an optical connector according to an exemplary embodiment.

Referring to FIG. 5A, an optical connector 210 is shown, in accordance with one or more embodiments of the present disclosure. In at least some embodiments, the optical connector 210 includes a fiber block 506, one or more connector lenses 220, optical fibers 222, and/or one or more connector alignment surfaces 504.

The one or more connector alignment surfaces 504 may correspond to the optic alignment surfaces 302 of the optic system 216 (e.g., allowing for precise passive alignment). For example, the one or more connector alignment surfaces 504 may be coupled to the optical connector 210. In at least one example, the one or more connector alignment surfaces 504 may be parallel to an optical axis of the one or more connector lenses 220 (as shown, for example, a distance measured along a length of a long narrow alignment surface may be parallel in the sense that the surface may be generally aligned/parallel in the direction of the optical axis such that a component mateable to the surface may slide parallel to the optical axis). For example, the one or more connector alignment surfaces 504 may be one or more alignment rods 504 (e.g., pins).

The optical fibers 222 may include, but are not limited to, single mode polarization maintaining optical fibers. The optical fibers 222 may be fixed relative to (e.g., actively aligned, and/or epoxied) to the one or more connector lenses 220 (and the one or more connector alignment surfaces 504).

In at least one embodiment, the optic system 216 is configured to be used with an optical connector 210 having one or more of the limitations described above (and vice versa). In at least one embodiment, the optic system 216 is at least one of: configured to be edge coupled with the optical connector 210; or configured to be used with collimating lenses (e.g., collimating connector lenses 220 and collimating interface lenses 218) of the optical connector 210. In at least one embodiment, the optical connector 210 is configured to be optically aligned to 20 or fewer microns in an X direction and/or a Y direction (the X-direction and Y-direction of FIG. 2A such that the Z-direction is aligned with an optical axis). In at least one embodiment, the optical connector 210 is operationally connected to the optic system 216.

In at least one embodiment, the one or more connector lenses 220 may be configured to at least one of: receive and/or transmit a collimated lightbeam, or at least partially collimate a lightbeam.

In at least one embodiment, by virtue of the optical connector 210 being configured to be used with a collimating lightbeam, the optical connector 210 has a Z-direction alignment tolerance (e.g., allows for misalignment) of (up to) at least 25 microns, and an X direction and/or Y direction of alignment tolerance of (up to) at least 5 microns.

It should be understood that the optical connector may be configured to be optically coupled and removably coupled to the optic system.

In at least one embodiment, at least one of the: optic system 216, optical connector 210, or coupled optic system 212 is configured to be compatible with single mode (SM) and polarization maintaining (PM) optical fiber.

Figure 5B:
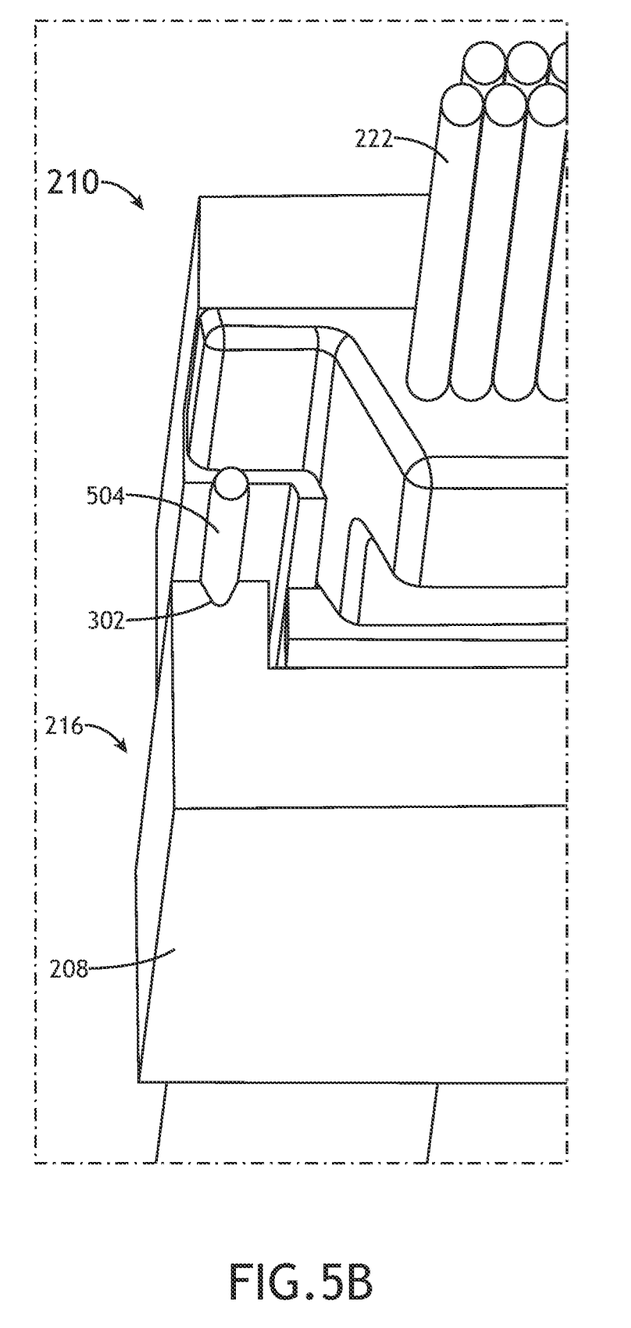
FIG. 5B shows a passive optical coupling of a coupled optic system according to an exemplary embodiment.

Referring to FIG. 5B, a passive optical coupling of a coupled optic system 212 is shown where at least some elements are partially cutaway for improved clarity, in accordance with one or more embodiments of the present disclosure. In at least one embodiment, as shown, one or more alignment rods 504 may correspond to and be aligned with one or more optic alignment surfaces 302 (e.g., precision V-shaped grooves).

In at least one embodiment, the coupled optic system 212 is configured for use in a silicon photonics-based transceiver/communication technology. In at least one embodiment, the coupled optic system 212 is configured for use in a silicon photonic transceiver and co-packaged optics (CPO) based system.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

We claim:

1. An optic system comprising:
a shelf; and
one or more interface lenses coupled to the shelf,
wherein the shelf comprises one or more optic alignment surfaces being configured for a passive alignment with an optical connector, the alignment surfaces comprise one or more groove surfaces, the optical connector comprising one or more connector lenses corresponding to the one or more interface lenses, the shelf comprising a groove depth to provide tolerance in an optical Y-direction for an alignment between a photonics integrated circuit and an optical fiber within collimated beam alignment requirements.

2. The optic system of claim 1, wherein at least one of:
the shelf being configured to be fixed in place relative to the one or more interface lenses; or
the shelf being fixed in place relative to the one or more interface lenses.

3. The optic system of claim 1, wherein the shelf is configured to accept a coupling of the optical connector, the optical connector configured to be removably couplable with the optic system.

4. The optic system of claim 1, wherein the one or more interface lenses are configured to at least one of, receive and/or transmit a collimated lightbeam, or at least partially collimate a lightbeam.

5. The optic system of claim 1, at least one of the one or more optic alignment surfaces being located on opposite sides of a middle portion, the middle portion configured to accept the optical connector, and the one or more optic alignment surfaces configured to allow for alignment within 20 microns relative to an X-direction and/or a Y-direction, wherein the Z-direction is parallel to an optical axis of the one or more interface lenses.

6. The optic system of claim 1, wherein the optic system is at least one of:
configured to be edge coupled with the optical connector; or
configured to be used with collimating connector lenses of the optical connector.

7. The optic system of claim 1, wherein the shelf comprises of a material selected from a group consisting of glass, silicon, and metal.

8. The optic system of claim 1, wherein the optical connector comprises an array unit.

* * * * *